United States Patent [19]
Owen et al.

[11] 3,872,925
[45] Mar. 25, 1975

[54] THROUGH-TUBING BRIDGE PLUG

[75] Inventors: Harrold D. Owen; Jamie B. Terrell, both of Fort Worth, Tex.

[73] Assignee: Gearhart-Owen Industries, Inc., Fort Worth, Tex.

[22] Filed: Mar. 18, 1974

[21] Appl. No.: 451,936

Related U.S. Application Data

[63] Continuation of Ser. No. 353,969, April 24, 1973, abandoned.

[52] U.S. Cl. ............ 166/286, 166/63, 166/123, 166/133, 166/135, 166/136, 166/162
[51] Int. Cl. ............ E21b 23/06, E21b 33/134
[58] Field of Search ............ 166/63, 286, 118, 123, 166/125, 133, 134, 135, 136, 162, 182, 181, 166/187, 126

[56] References Cited
UNITED STATES PATENTS

| | | | |
|---|---|---|---|
| 2,394,977 | 2/1946 | Boynton............................ | 166/125 |
| 2,409,811 | 10/1946 | Taylor et al. ....................... | 166/125 |
| 2,618,344 | 11/1952 | Turechek et al..................... | 166/63 |
| 2,618,345 | 11/1952 | Tucker................................ | 166/63 |
| 2,695,065 | 11/1954 | Baker et al. ........................ | 166/63 |
| 2,969,839 | 1/1961 | Greene .............................. | 166/63 |
| 2,978,029 | 4/1961 | O'Reilly et al................... | 166/123 X |
| 3,032,111 | 5/1962 | Corley et al. .................... | 166/126 X |
| 3,079,997 | 5/1963 | Blydorp ........................... | 166/126 X |
| 3,489,216 | 1/1970 | Armstrong...................... | 166/135 X |

Primary Examiner—David H. Brown
Attorney, Agent, or Firm—Wofford, Felsman, Fails & Zobal

[57] ABSTRACT

Method and apparatus for emplacing a bridge plug through tubing in a well penetrating subterranean formations characterized by the following plurality of steps, without requiring removal of the tubing. A dump bailer containing cement slurry and a covered fabric bag and locking dogs are run downwardly through tubing to the predetermined depth. Dogs are released for holding. A cover is lifted from around the fabric bag, and the cement slurry is dumped via a collapsible fill tube to fill the bag to expand it outwardly into contact with the casing. The dump bailer and cover tube are removed from the well. A supplemental batch of cement slurry is dumped on the top of the bag of cement slurry. An open passageway is provided through the bag of cement and the supplemental batch of cement slurry during curing. The open passageway is closed. Finally, if desired, additional cement slurry is dumped onto the set bridge plug and allowed to set. Also disclosed are specific structure of the various means for carrying out the functions implicit in the steps; as well as operational details and structure.

13 Claims, 16 Drawing Figures

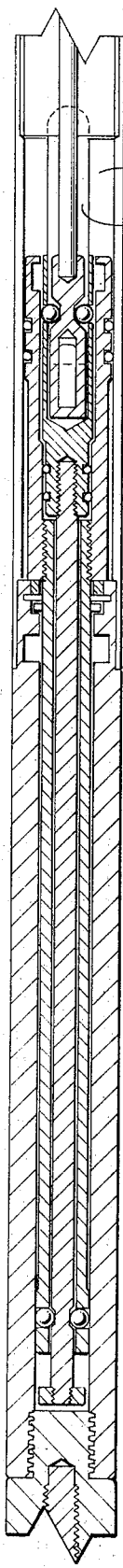
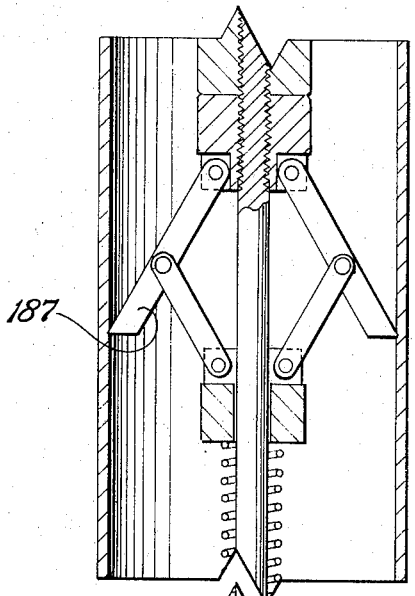
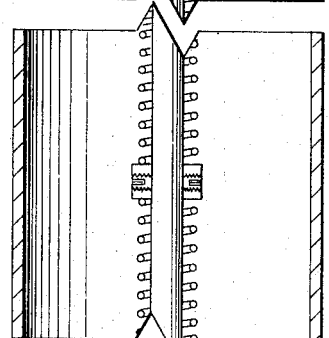
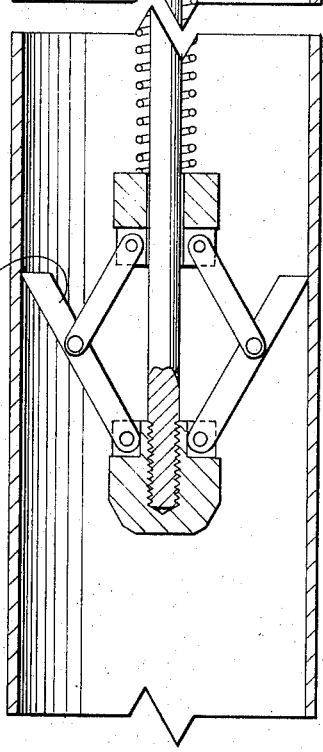
Fig.4C  Fig.4D

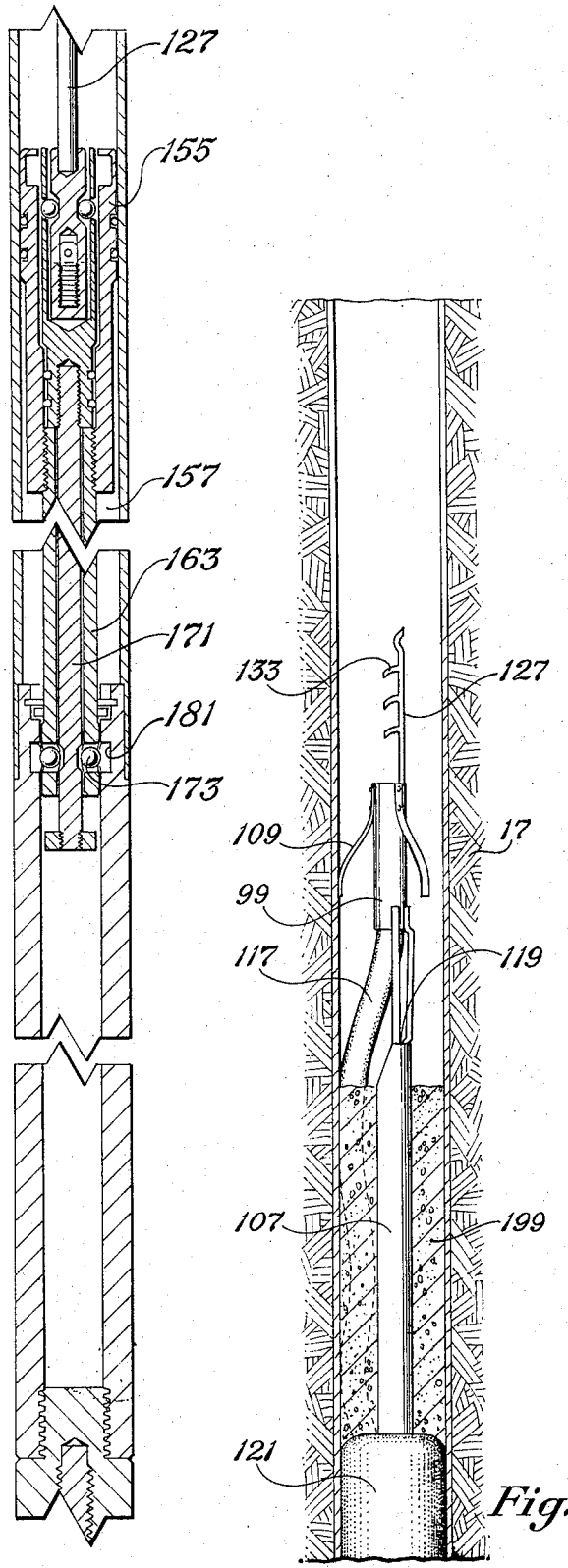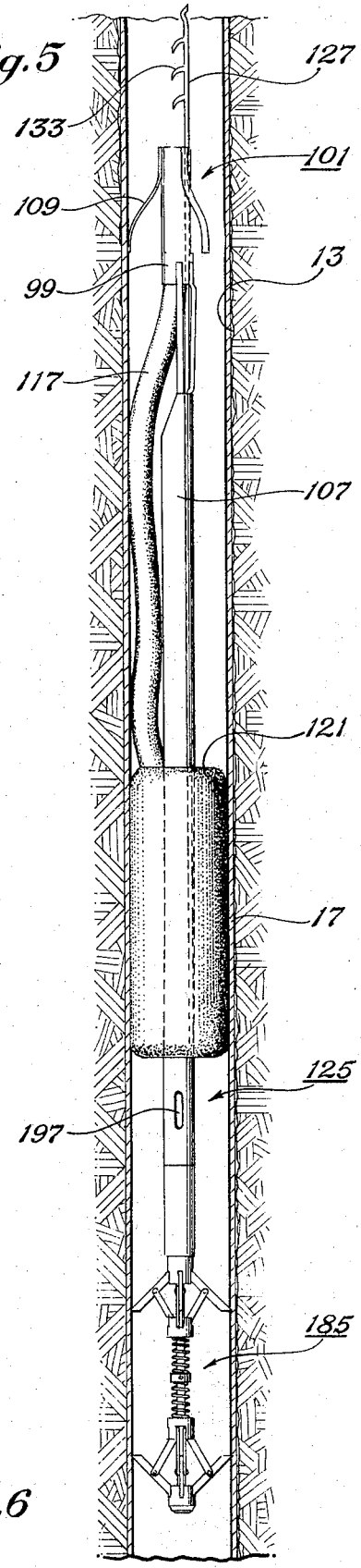

THROUGH-TUBING BRIDGE PLUG

This application is a continuation of co-pending application U.S. Ser. No. 353,969, filed Apr. 24, 1973, now abandoned.

BACKGROUND OF THE INVENTION

1. Field of the Invention

This invention relates to sub-surface well apparatus; and, more particularly, to method and apparatus for setting a bridge plug or the like in a well bore penetrating subterranean formations and having tubing therewithin.

2. Description of the Prior Art

The need for bridge plugs in well bores penetrating subterranean formations is well known; particularly in oil- or gas-producing wells. For example, it frequently happens that there are more than one zones, or formations, of production that are to be produced independently of each other or wells in which it may be desirable to seal off lower producing zones for one or more reasons. Emplacement of bridge plugs does not present a particularly difficult problem during the finishing of the well and before the tubing has been emplaced thereinto. When it is desired to emplace a bridge plug in a well bore after tubing has been inserted into a well, however, the prior art devices have not produced totally satisfactory method and apparatus for setting the bridge plug through the tubing. Consequently, operators of such wells with tubing have ordinarily resorted to pulling the tubing.

Our experience in building a through-tubing bridge plug has indicated that the following features are desirable and have not been provided heretofore:

1. A bridge plug employing set cement is a preferable permanent type of bridge plug and an open passageway should be provided for venting pressure or continuing production while the cement slurry is curing, or setting.
2. The apparatus for effecting the set cement should have characteristics that will provide for the set cement the best strength and other physical properties that is possible.
3. The apparatus should provide the largest possible fill tubes for filling a container to be left in the well with the cement without obstructing the open passageway allowing fluid to flow through the cement during setting.
4. The apparatus should provide an elongate member such as folded cable, that avoids fouling, or entanglement; twisting; and the like common in the prior art apparatus.
5. The open passageway provided through the set cement should be plugged by a plug that is moved into position within the longitudinal extent of the set cement for great strength and protection from the well fluids and pressure.
6. The apparatus should provide an interlock system such that only after the vent plug is finally pulled into the correct position, a positive indication of this proper positioning can be pulled from the well bore to indicate to an operator on the surface that the plug has been properly set. The operator, then, can finally emplace a large amount of cement or the like, or take whatever other action he desires, secure in the knowledge that the basic bridge plug has been properly set.
7. The apparatus should provide the largest possible vent through the cement while the cement is setting.

As indicated hereinbefore, the prior art has failed to provide totally satisfactory method and apparatus for setting a bridge plug, that has the foregoing features.

Accordingly, it is an object of this invention to provide method and apparatus for setting a bridge plug in a well bore penetrating subterranean formations and having tubing therein without pulling the tubing and having one or more of the foregoing features not heretofore provided by the prior art.

It is another object of this invention to provide method and apparatus having all of the foregoing features and effecting the object delineated immediately hereinbefore.

These and other objects will become apparent from the following descriptive matter, particularly when taken in conjunction with the drawings.

BRIEF DESCRIPTION OF THE DRAWINGS

FIGS. 4A–D are partial side elevational views, partly in section, showing, respectively, the top, upper intermediate, lower intermediate and bottom sections of the through-tubing bridge plug assembly of FIG. 1 in its uncovered emplacement with the cable extended and the cement dump valve open.

FIG. 5 is a schematic side elevational view, partly in section, of a portion of the embodiment of FIG. 1 that is left in the well during initial setting of cement slurry with a fluid bypass provided.

FIG. 6 is a partial schematic side elevational view, partly in section, of the embodiment of FIG. 5 with additional cement emplaced in the well bore, but still having a fluid bypass passageway therethrough.

FIG. 7 is a partial side elevational view, mostly in section, of the lower intermediate section of the embodiment of FIG. 1, showing the vent plug assembly having been moved upwardly within the vent tube assembly.

DESCRIPTION OF PREFERRED EMBODIMENTS

Figure 1:
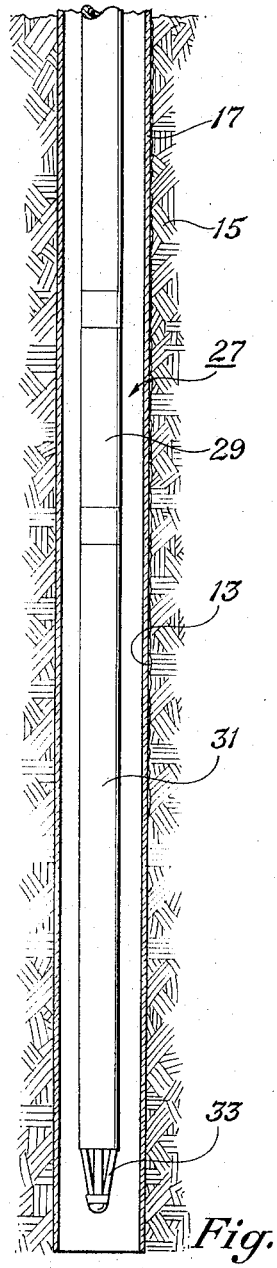
FIG. 1 is a schematic elevational view of apparatus in accordance with a preferred embodiment of this invention, shown emerging from tubing within a cased well bore.

Referring to the drawings, FIG. 1 illustrates the apparatus 11 for emplacing a bridge plug in the well bore 13 penetrating subterranean formations 15. As illustrated, the well bore 13 contains casing 17 and tubing 19. The apparatus 11 includes well cable 21, cable head assembly 23, dump bailer 25 and the bridge plug assembly 27. As illustrated in FIG. 1, the bridge plug assembly 27 is within a cable subsection 29 and a cover tube 31. Also shown are portions of the bottom dogs 33, frequently referred to as the primary dogs.

The various types of casing 17 and tubing 19 are well known and need not be described herein. It is sufficient to note that frequently the tubing has so small an internal diameter that emplacement of a bridge plug therethrough has been impractical heretofore, so the tubing was pulled from the well in order to set the bridge plug. This expense and trouble is obviated by the apparatus 11.

Figure 2A:
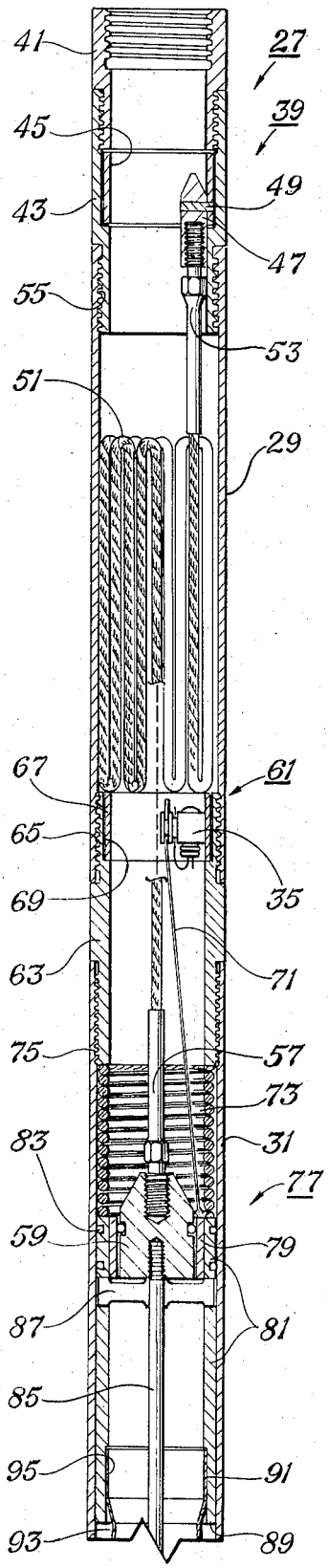
FIGS. 2A–D are partial side elevational views, partly in section, showing, respectively, the top, upper intermediate, lower intermediate and bottom sections of the through-tubing bridge plug assembly of the embodiment of FIG. 1 in the run-in configuration.

The well cable 21 may comprise a conventional well cable having the usual firing wire (not shown) down its center. The firing wire traverses the length of the dump bailer and is connected to a single squib stud 35 located in the top of the bridge plug immediately beneath the cable subsection 29, FIG. 2A. The function of the squib stud 35 will be delineated hereinafter with respect to initiating the setting of the bridge plug.

Similarly, the cable head assembly 23 is conventional and need not be described herein. It may include a collar locator or the like for verifying when the apparatus 11 has passed out of the end of the tubing or otherwise verifying a predetermined depth useful in properly emplacing the bridge plug.

The dump bailer 25, 37 is a conventional dump bailer. Since these dump bailers are well known, they need not be described in length herein. It is sufficient to note that the dump bailer 25 may comprise a plurality of sections that are made up to hold the desired amount of cement. For example, we have found it convenient to employ from 3 to 10 ten-feet dump bailer sections to carry the necessary cement for casing ranging in size from 4½ inches to 9⅝ inches in diameter. These exemplified dump bailer sections are only 1⅝ inch outside diameter so as to be lowered longitudinally through almost any producing tubing string; for example, 2 inch tubing or larger.

The bridge plug assembly 27 is illustrated in FIGS. 2A-D in the run-in configuration. The bridge plug assembly 27 includes a cable assembly 39 within the cable subsection 29. Specifically, a cable retainer 41 is threaded for connection with the bottom end of the dump bailer so as to contain the cement slurry therewithin. A cable sub 43 is threadedly connected with the cable retainer 41 so as to lock in place a cable ring 45. The cable ring 45 has a cable anchor 47 anchored thereto by way of anchor pin 49. The top end of a tool cable 51 is connected with the cable anchor 47 by way of threaded shank 53. Actually, the threaded shank 53 may be thought of as the tool cable, since it is so much a part thereof.

To prevent entanglement and twisting, the tool cable 51 is disposed in vertically arranged "sheep shank" folds, as illustrated. The sheep shank folds are about 18 inches in length. This is advantageous over the conventionally used horizontally coiled cable that frequently results in kinking and fouling of the cable or at least twisting in either the coiled opening or uncoiled position. With the vertical "sheep shank" type fold, the cable comes out without fouling, without kinking and without twisting. The term "sheep shank" fold is employed to denote the illustrated fold which is so similar to the fold employed in the sheep shank knot. Respective sheep shank folds are arranged neatly adjacent each other within the cable subsection, or cable tube, 29. The cable subsection 29 is threadedly connected with the cable sub 43 by threaded connection 55. The bottom end 57 of the tool cable 51 is connected with cement valve 59 for opening it and dumping the cement slurry after the tool cable has been fully extended, as will become apparent from the descriptive matter hereinafter.

Figure 3D:
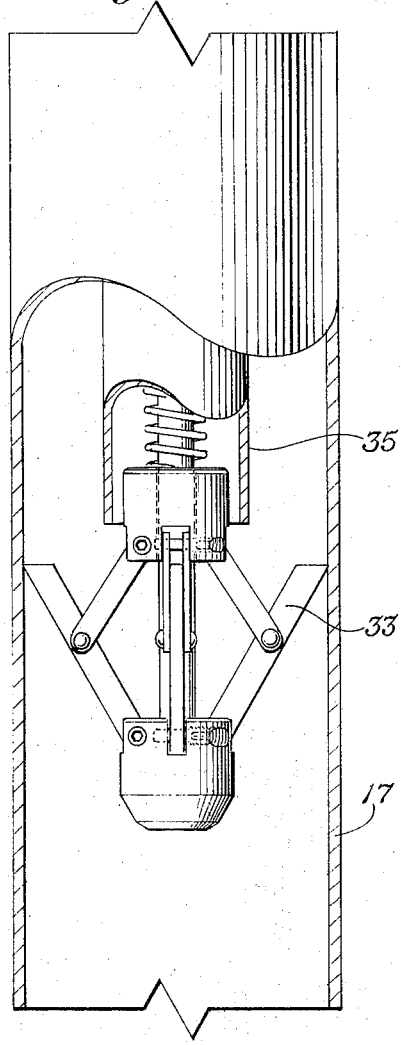
FIGS. 3A and 3D are partial side elevational views, partly in section, showing, respectively, the top and bottom sections of the through-tubing bridge plug assembly of FIG. 1 at the initial release of the bottom dogs.
Figure 3A:
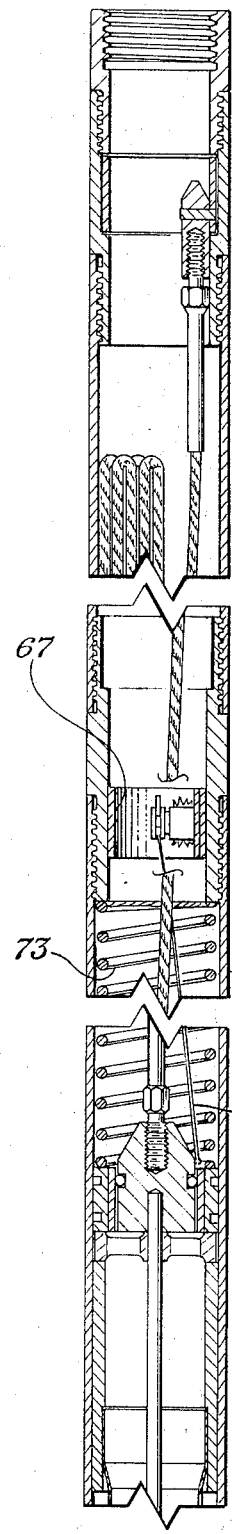

The bridge plug assembly 27 also includes a cover tube assembly 61. Therein, the cover tube sub 63 is connected with the cable subsection 29 by threaded connection 65. A cylindrical stud band 67 is disposed in an annular recess 69 in the top of the cover tube sub 63. The ends of the stud band 67 are maintained adjacent each other by the squib stud 35. When the squib stud 35 has its squib exploded, the end of the squib breaks, releasing the retainer strap 71. The retainer strap 71 is connected with the stud band 67 at the squib stud 35 for holding in a compressed condition a kick out spring 73. The kick out spring 73 is attached, as by welding, to the bottom of the cover tube sub 63 so its top moves with the cover tube sub 63. When the retainer strap 71 is released, it allows expansion of the kick out spring 73, as illustrated in FIG. 3A. Expansion of the kick out spring 73 moves the remainder of the bridge plug assembly therebelow downwardly within the cover tube 31 a small amount. As can be seen by comparing FIGS. 2D and 3D, only a small downward movement is required to free the primary dogs 33 so they can engage the casing 17 to hold against an upward force for removal of the cover tube 31 from around the remainder of the bridge plug assembly 27. The cover tube 31 is pulled upwardly when the dump bailer 25 and cable retainer 41 are pulled upwardly, as described in operation hereinafter.

The bridge plug assembly 27 also includes a cement valve assembly 77. The cement valve assembly 77 includes the cement valve 59 that sealingly engages a retainer band 79 that is sealingly disposed within the valve body 81. The valve body 81 sealingly engages the cover tube 31. The respective sealing engagements are effected by way of suitable seal means, such as o-rings 83, disposed in grooves and engage smooth opposite and sealing surfaces. The cover tube 31 may be slid upwardly around the valve body 81 without leaking cement slurry because of the outer o-rings 83 in sealing engagement with the internal walls of the cover tube 31.

The cement valve 59 has a limit rod 85 connected to its lower end by suitable means, such as the illustrated threaded connection. The limit rod 85 is slidably disposed in an aperture in the limit guide 87 that is retained in position in the valve body 81.

The bottom end 89 of the valve body 81 marks the uncover point, or the point to which the cover tube is raised to uncover a cement valve tube and an inflatable bag for the cement. Expressed otherwise, when the bottom end of the cover tube 31 has been raised to the uncover point, the cement valve 59 will have been opened to dump the cement slurry from the dump bailer. As discussed hereinafter, upward movement is stopped to allow the cement slurry to be dumped into an inflatable fabric bag and obtain an initial set.

Figure 4A:
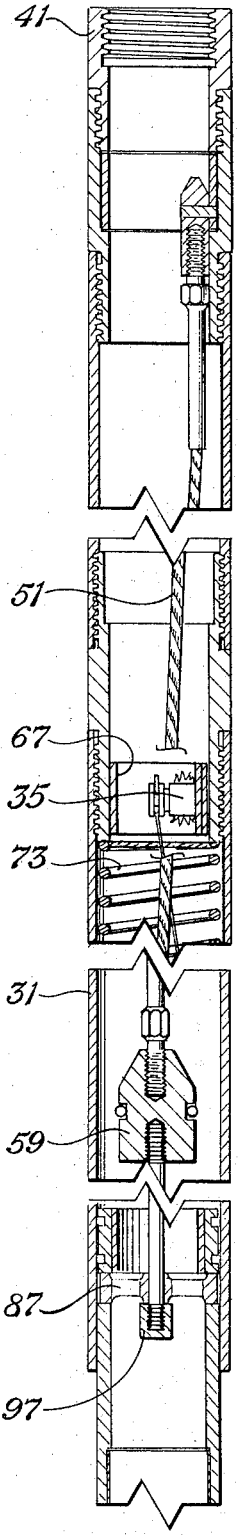

An enlarged top end 91 on a cement valve tube 93 is connected with the valve body 81 by way of annular recess 95. The connection is made by way of suitable means, such as a swaged or threaded connection, that will have adequate strength to shear a shear pin 103 and pull the cement valve tube 93 upwardly when the valve body 81 is pulled upwardly. The valve body 81 is begun to be pulled upwardly only after the limit stop 97 at the lower end of the limit rod 85 encounters the limit guide 87 and well after the cement valve 59 is pulled upwardly in opening to dump the cement slurry. As illustrated in FIG. 4A, the cover tube 31 is not pulled from around the valve body 81 in order to define a flow passageway for the cement slurry.

The bottom of the cement valve tube 93 is connected with the top of a centralizer tube 99 in the vent tube assembly 101 by way of a shear pin, such as brass screws 103. Thus, a first upward force in the range of 250–400 pounds or so will shear the brass screws 103 and pull the cement valve tube away from the vent tube assembly 101 to leave it in the well bore.

Figure 4B:
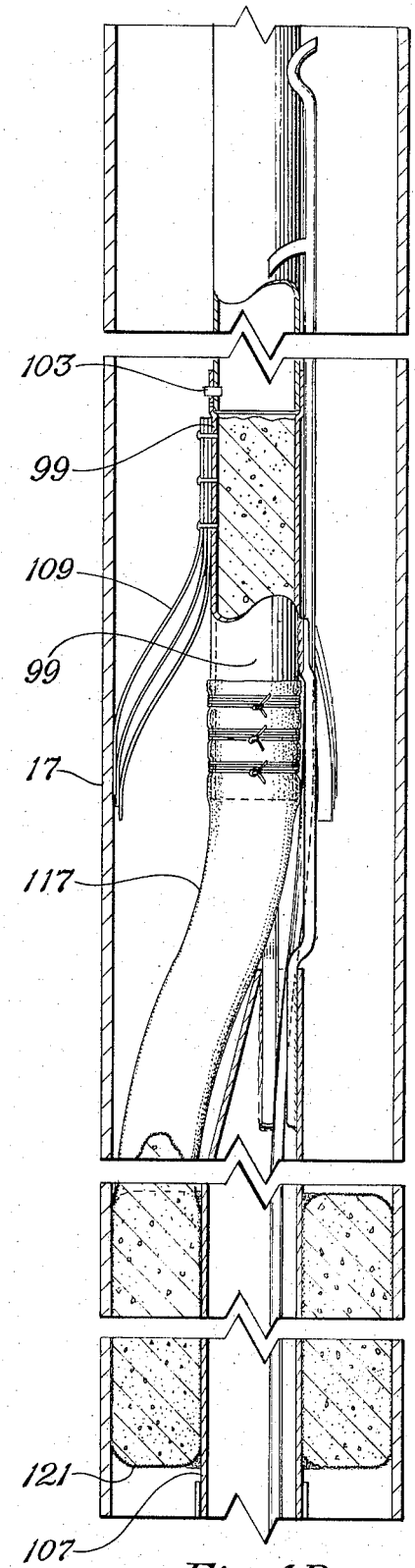

As indicated hereinbefore, the bridge plug assembly 27 includes a vent tube assembly 101 having, in addition a centralizer tube 99, support rods 105 and vent tube 107. The centralizer tube 99 has a plurality of centralizers 109 spaced therearound for centering the bridge plug assembly within the casing when the cover tube 31 has been removed from around the centralizer 109. As illustrated, the centralizers 109 comprise springs that have their upper end held in place by suitable means, such as rivets, 111 and have their lower ends biased outwardly so as to spring outward into engagement with a surrounding surface. FIG. 4B illustrates the arrangement in which the centralizers 109 have expanded outwardly into engagement with casing 17.

The support rods 105 are affixed, as by welded ends 113 and 115, respectively, to the centralizer tube 99 and the vent tube 107. Thus, the support rods 105 hold the centralizer tube 99 and the vent tube 107 in fixed longitudinal relationship, yet still allowing attachment of a collapsible fill tube 117 to the lower end of the centralizer tube 99. The upper end of the collapsible fill tube 117 is tied around the lower end of the centralizer tube 99, as illustrated in FIG. 4B. The collapsible fill tube 117 is made of water impermeable material, such as fiberglass impregnated with a fluorocarbon; such as, polytetrafluoroethylene, (Teflon T-100). The collapsible fill tube 117 is particularly advantageous in that it is flat and can be wrapped around the vent tube 107 during the run-in configuration to take up very little space, yet can distend outwardly to afford a fully open passageway through which the cement slurry readily flows, as illustrated in FIG. 4B.

Figure 2B:
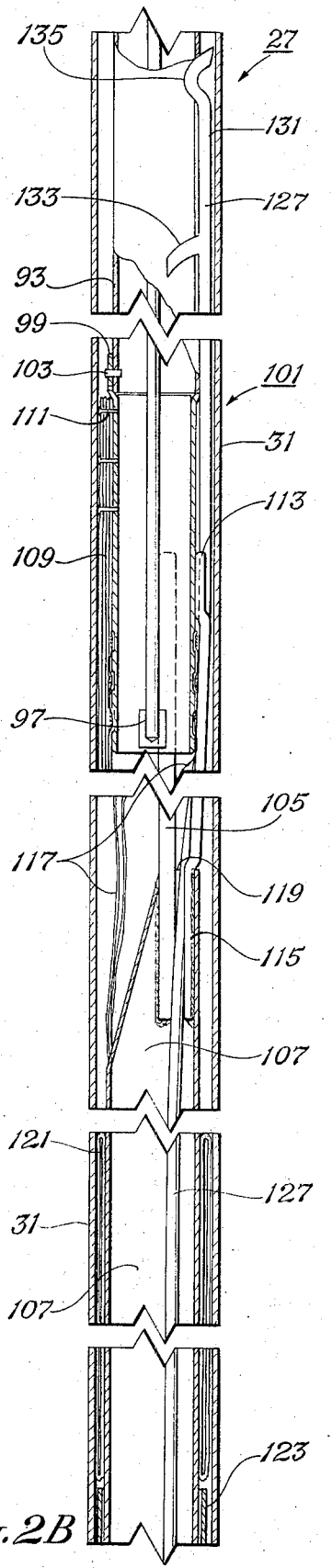

The vent tube 107 has its top end 119 open for providing an open passageway for flow of fluids therethrough even while cement is curing after it has inflated an inflatable, or radially extensible, bag 121. As can be seen in FIG. 2B, the inflatable bag 121 is disposed intermediate the cover tube 31 and the vent tube 107. We have found that the inflatable bag 121 need only have a length in the range of about 1–3 feet to be satisfactory. The collapsible fill tube 117 is sealingly sewed into an aperture in the top of the collapsible bag 121. The inflatable bag 121 is formed of a material that has a slight permeability to water so as to allow only water and no particulate material to seep from the cement slurry slowly; for example, several cubic centimeters per minute; and improve the compressive strength and other physical properties of the cured and set cement that is ultimately formed in the inflated bag 121, as illustrated in FIG. 4B. We have had satisfactory results when bag 121 is made of strong fabric; for example, synthetic polyester fabric (Dacron) and Nylon fabric.

Figure 2C:
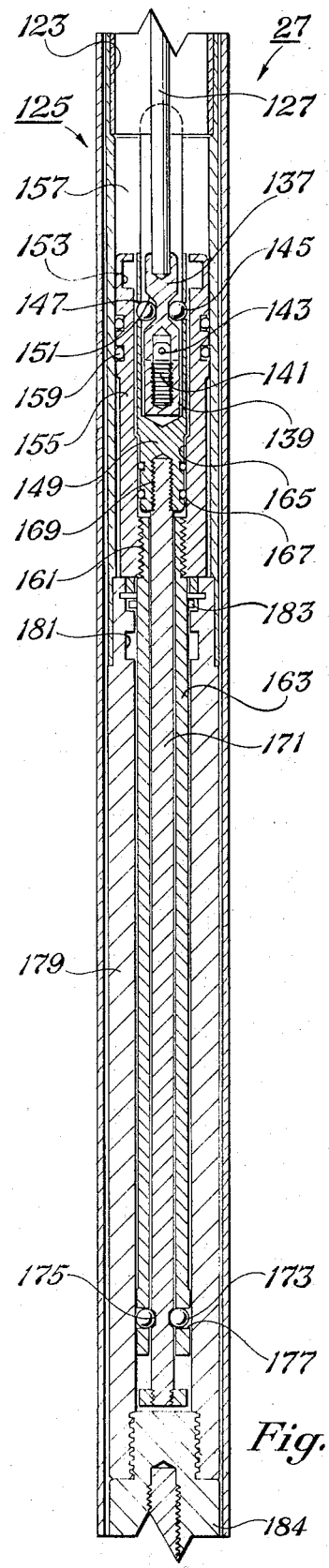
Figure 2D:
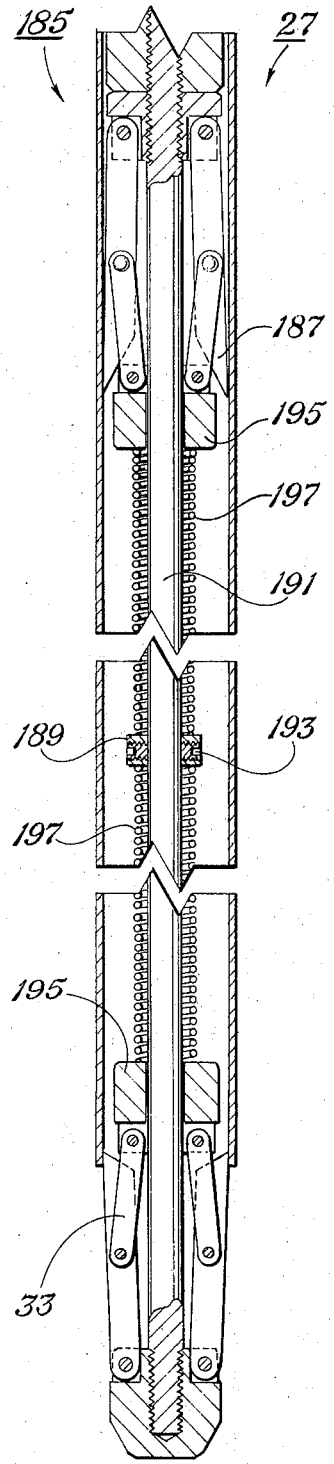

A vent sub 123 is provided at the lower end of the vent tube assembly for connection with a vent plug assembly 125, FIG. 2C.

As indicated, the bridge plug assembly 27 contains a vent plug assembly 125 for closing the passageway through the vent tube assembly 101, or plugging the vent tube 107. The vent plug assembly 125 contains an elongate longitudinally, or upwardly, extending closure member, such as closure rod 127. The closure rod 127 terminates near its top end 131 in a plurality of hook spurs, or barbs, 133 and a modified Bo-peep crook 135, FIG. 2B, to facilitate being grasped by a subsequent fishing tool or the like for being pulled upwardly to close the passageway through the vent tube 107. The closure rod 127 is releasably connected with the remainder of the vent plug assembly 125 by way of releasable closure release 137. As will become clearer from the descriptive matter hereinafter, the vent plug assembly 125 has a unique interlock arrangement that prevents release of the closure rod 127 until the vent plug has been properly seated in the vent tube 107 to close off the passageway therethrough. The closure rod thus when returned to above ground constitutes a form of tattle tell, or proof positive that the vent tube 107 is plugged and excellent evidence that the bridge plug is properly set. The closure release 137 includes a ball wedge 139 at its lower end. The ball wedge 139 is shearably connected with the upper portion of the closure release by way of suitable shear pin means 141. The shear pin means 141 is connected with the ball wedge 139 by any suitable means such as a threaded connection and is connected with the upper portion of the closure release by suitable means, such as a shear pin 143. A second upward force greater than the first upward force and in the range of about 300–450 pounds will shear the connection between the ball wedge 139 and the remainder of the closure release 137 and allow pulling the closure rod 127 upwardly. This force cannot be developed, however, as long as a plurality of balls 145 are trapped in their respective apertures 147 in the skirt portion of a captive plug 149. The balls 145 cannot be moved free of the peripheral groove 151 of the closure release 137 until their apertures 147 have been moved upwardly to a point where the balls 145 can be moved into an annular recess 153 in a vent plug 155. The ball wedge 139 has an inverted frusto-conical taper of about 3 degrees (°) in order to wedge solidly against the balls 147 to hold them in the recess 153 and to oppose the force that will shear the shear pin means 141 to free the upper portion of the closure release 137. The vent plug 155 is slidably and sealingly mounted in the internal bore 157 traversing longitudinally of the vent sub 123. Sealing engagement is retained by way of suitable seal means, such as o-ring 159, disposed in peripheral grooves and engaging a coextensive sealing surface.

The vent plug 155 is connected by suitable means, such as threaded connection 161, with plug shaft 163 so they move upwardly or downwardly in unison.

The captive plug 149 sealingly engages an internal bore 165 within the vent plug 155, as by o-rings 167. The captive plug 149 is connected by suitable means, such as threaded connection 169, with captive rod 171 so they move in unison. The captive plug 149 and the captive rod 171 can be moved longitudinally relative to the vent plug 155 and plug shaft 163. Relative movement therebetween is prevented, however, by a plurality of balls 173 that are retained in respective apertures 177 in plug shaft 163 and engage annular groove 175 disposed peripherally about captive rod 171.

The balls 173 are retained in their respective apertures 177 by plug housing 179. The plug housing 179 is connected with the bottom end of the vent sub 123 by any suitable means. The captive rod 171, plug shaft 163 and balls 173 are free to move longitudinally of the plug housing 179. They are pulled upwardly in order to allow the balls 173 to move radially outwardly into annular groove 181 cut into the plug housing 179 near its top end. Movement of the balls 173 outwardly frees the captive rod 171 for movement relative to plug shaft 163. A retainer ring 183 is maintained at a predetermined location and stops the plug shaft 163 to retain it at an attained longitudinal position.

A dog sub 184 is provided for connection with a dog assembly 185.

As indicated, the bridge plug assembly 27 also includes a dog assembly 185 having the primary dogs 33 and secondary dogs 187. The dog assembly 185 has a central mounting ring 189 that is mounted on shaft 191, as by set screws 193. Each of the primary and secondary dogs 33 and 187 have slidably mounted expander rings 195 that are connected to their respective dogs by illustrated pivotal linkages for expansion of the dogs outwardly once the dogs are free. The sliding movement of expander rings 195 for expanding the dogs is effected by respective springs 197 disposed concentrically about shaft 191 and intermediate the central mounting ring 189 and the respective expander rings 195. A typical expanded position of the respective dogs is illustrated in FIG. 3D wherein the primary dogs 33 have been expanded outwardly into contact with the casing 17. The dog assembly 185 is relatively conventional and further detailed description is believed unnecessary herein.

In operation, the apparatus 11 for emplacing a bridge plug in a well bore penetrating subterranean formations is assembled as illustrated and described hereinbefore with respect to FIGS. 1 and 2A-D. Ordinarily, the bridge plug assembly 27 will be about 15 feet in length. When combined with the dump bailer 25, the entire apparatus may be from 40 to as much as 115 feet or more in length. Where such lengths are employed, the respective sections are screwed together as they are inserted into the well using conventional apparatus and methods. The cement slurry is then emplaced in the dump bailer 25 and cable subsection 29. The apparatus 11 is lowered through the tubing 19 until it is out of the bottom end of the tubing and emplaced at the proper depth in the well bore 13. The apparatus 11 is stopped by stopping the downward movement of the well cable 21 by the conventional surface equipment, such as a motorized cable drum (not shown). The explosive squib stud 35 is "exploded", allowing expansion of the kick out spring 73, as illustrated in FIG. 3A. Expansion of the spring 73 pushes the remainder of the bridge plug assembly 27 downwardly a slight amount, freeing the primary dogs 33 from the bottom end of the cover tube 31. The primary dogs 33 spring outwardly into engagement with the casing 17, as illustrated in FIG. 3D.

Thereafter, the cover tube 31 is lifted upwardly by pulling upwardly on the dump bailer 25. As the cover tube is pulled from around the flexible bag 121 and the collapsible fill tube 117, they are free to distend radially outwardly. As illustrated in FIG. 4A, the stud band 67 and the "exploded" squib on stud 35, along with expanded spring 73 are pulled upwardly as the cable retainer 41 is pulled upwardly. The cover tube 31 is also pulled upwardly. After several feet of upward movement, the tool cable 51 will have been fully played out. Thereafter, the cement valve 59 is opened, as illustrated in FIG. 4A allowing the cement slurry to flow downwardly out of the dump bailer and into the collapsible fill tube 117 and the expansible bag 121, as illustrated in FIG. 4B. The operator at the surface may open the cement valve 59 simply by reeling in the sufficient amount of well cable 21. Experience will indicate how much of the well cable 21 is required to be reeled in to effect the desired full extension of the tool cable 51 and the opening of the cement valve 59. On the other hand, the cement valve 59 is preferably lifted upwardly until the limit stop 97 encounters the limit guide 87, FIG. 4A, and imposes an additional force onto the well cable 21. The bottom end of the cover tube 31 moves upwardly to the uncover point. At this point, upward movement is stopped and the cement slurry is allowed to fully distend the inflatable bag 121 and the collapsible fill tube 117, as illustrated in FIG. 4B. An additional time interval of from 10 to 20 minutes is employed to allow an initial cure, or set, to be obtained in the cement slurry within the inflatable bag 121. As can be seen, the inflatable bag 121 is extended radially outwardly into sealing engagement with the casing 17, as well as being sealingly connected with the vent tube 107.

As indicated hereinbefore, the centralizers 109 will spring outwardly to centralize the vent tube 107 and allow substantially uniform expansion of the inflatable bag 121 radially outwardly as the cement slurry is poured thereinto.

As illustrated in FIGS. 4C and 4D, both the primary and secondary dogs 33 and 187 have been set so as to retain the bridge plug assembly 27 in place against both upward and downward forces. The aperture 197, FIG. 4C is in fluid communication with the internal bore 157 that provides an open passageway upwardly through the vent tube 107. Consequently, the well may continue to produce fluids without building up an excessive differential pressure across the setting cement slurry in the inflated bag 121.

After a suitable period of time, the cable retainer 41 and the dump bailer 25 are pulled farther upwardly with a first force, shearing the brass screws 103 and pulling free of the centralizer tube 99. The dump bailer 25, the cable assembly 39 and the cover tube assembly 61 are removed from the well bore 13. As illustrated in FIG. 5, the vent tube assembly 101, the vent plug assembly 125 and the dog assembly 185 are left in the bore 13. The inflatable bag 121 is distended fully radially outwardly to sealingly engage the casing 17. The collapsible fill tube 117 remains full of cement slurry. The closure rod 127 extends upwardly through the entire assembly for being grasped by a pulling apparatus to pull the vent plug assembly 125 upwardly for closing off the open passageway through the vent tube 107.

After a suitable time to allow the cement to attain adequate set strength, a dump bailer is run into the well on a second trip and supplemental batch of cement slurry 199, FIG. 6, is dumped on top of the inflated bag 121. The supplemental batch of cement slurry 199 is less than that which would fill the void space interiorly of the casing 17 to a height greater than the top end 119 of the vent tube 107 so as to provide an open passageway also through the supplemental batch of cement slurry during its setting. This avoids any adverse effects from production fluids flowing through the cement slurry or from building up an excessive differential pressure thereacross.

After a suitable time interval to allow sufficient said strength to develop in the supplemental batch of cement slurry 199, as well as in the cement within the inflated bag 121 and fill tube 117, a fishing tool or other sort of pulling tool is lowered into the well to grasp the hook spurs, or barbs, 133 for pulling the vent plug assembly 125 upwardly to close off the open passageway through the vent tube 107. As illustrated in FIG. 7, the vent plug 155 is moved upwardly above the aperture 197, FIG. 4C, to close the open passageway afforded by internal bore 157. As illustrated in FIG. 7, the balls 173 are free to move outwardly into the annular recess 181 and free the captive rod 171 for movement upwardly relative to plug shaft 163. Continued upward pulling on the closure rod 127 pulls the captive rod 171 and the captive plug 149 upwardly with respect to the vent plug 155 and the plug shaft 163. This allows the balls to move radially outwardly through their apertures 147 into annular groove 153, FIG. 8. This frees the closure release 137 from its trapped relationship with respect to the skirt of the captive plug 149.

Figure 8:
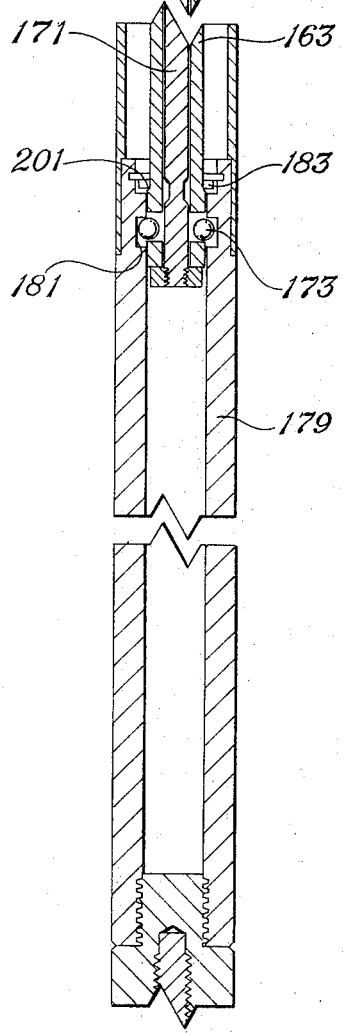
FIG. 8 is a partial side elevational view, mostly in section, of the embodiment of FIG. 7 with the captive rod and closure release moved upwardly for freeing the closure release.
Figure 9:
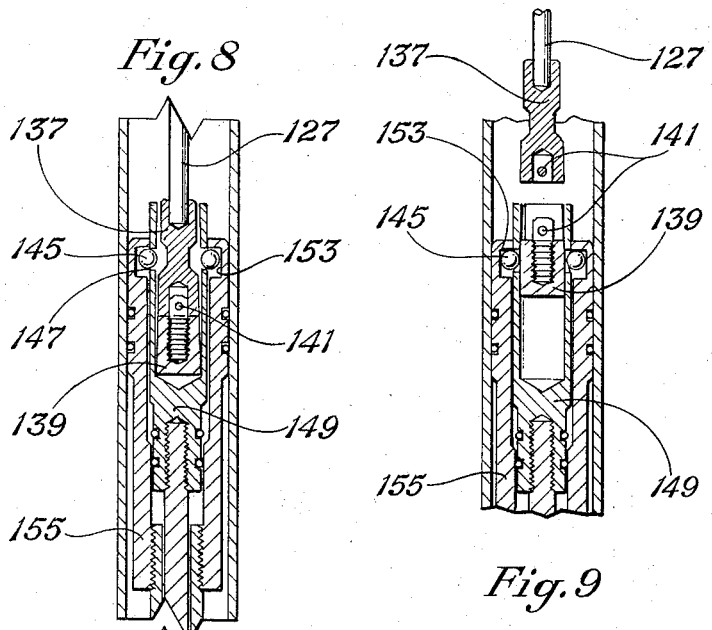
FIG. 9 is a partial side elevational view, mostly in section, of the embodiment of FIG. 8 with the closure release pulled free and the balls wedged into position interlocking the captive rod and the immobilized plug shaft.

As illustrated in FIG. 9, further upward pulling will pull the ball wedge 139 upwardly against the balls 145, wedging them into the recess 153, locking the captive plug 149 to the vent plug 155. As can be seen in FIG. 8, the plug shaft 163 is immobilized against further upward movement, even under the pressure from below, by the retainer ring 183 in the plug housing 179 engaging shoulder 201 and by engagement of the balls 173 with the annular groove 181 when forced radially outwardly by the full diameter of captive rod 171. The plug housing 179 is immobilized against both upward and downward forces through its interconnection with the dog assembly 185 and the vent tube 107 in the set cement in bag 121 and in supplemental batch 199. The plug shaft 163 and the respective annular grooves 153 and 181 are so proportioned and located that the vent plug 155 seats within the cement inflated bag 121. This affords greater protection, both from failure due to excessive forces and due to reaction with the well bore fluids.

As illustrated in FIG. 9, the closure rod 127 and the top portion of the closure release 137 are pulled free by shearing of shear pin means 141 for removal from the well. A bridge plug is formed by the vent plug 155 having been moved upward within the vent tube 107 to close off the passageway therethrough and by the set cement in the inflated bag 121 and in the supplemental batch of cement 199; similarly as illustrated in FIG. 6, except that the closure rod 127 will have been pulled upwardly therefrom.

To ensure that the bridge plug seals completely and for long duration, as is required for permanent type bridge plugs, an additional cement slurry is dumped on top of the cement in supplemental batch 199 and the inflated bag 121. The additional cement slurry is preferably dumped by way of suitable dump bailers, in accordance with conventional practice. The cement may be emplaced for the desired distance up hole, from a few feet to several tens of feet or more. In any event, it covers the vent tube assembly, since there is no longer any fluid flowing upwardly through the plugged vent tube 107. Any desired strength can be obtained in the resulting final bridge plug, depending upon the length of the cement plug finally effected. There is no problem with the weight of the additional cement slurry since the additional cement 199, the cement inflated bag 121 and the dog assembly 185 have more than adequate strength to bear the weight for a properly engineered bridge plug.

In the foregoing descriptive matter, the following generic considerations are inherent. Specifically, a closure means comprises the closure rod 127, the closure release 137 and the shear pin means 141 and 143. The closure means is connected with vent plug 155 for moving it into its closed position within the vent tube 107.

A release means disposed within the cover tube 31 and adapted to release the dog means comprising the dog assembly 185, comprises the stud band 67, squib stud 35, retainer strap 71, and kick out spring 73. Thus, the release means is remotely operable by an operator at the surface to kick the primary dogs 33 out of the bottom end of the cover tube 31 as described hereinbefore.

An opening means comprises cement valve 59, retainer band 79, tool cable 51 and respective cable anchor and cable retainer 41 that are connected with the dump bailer for effecting dumping of the cement slurry from the dump bailer into the fill tube 117 and the fabric bag 121 as described hereinbefore.

As implicit hereinbefore, suitable sealing surfaces are provided adjacent the longitudinal extent of traverse of the respective sealing means, or o-rings, to provide the requisite seals and sealing surface.

From the foregoing it can be seen that this invention achieves all of the objects delineated hereinbefore. Specifically, the apparatus 11 can be designed to go through any diameter tubing and set to a bridge plug in almost any casing; for example, ranging in size from 4 inches to 9⅝ inches and with deviations up to 45°. In fact, a series of through-tubing bridge plugs for insertion through 1⅝ inch tubing is being developed. Even larger or small size casings and greater deviations can be accommodated. The bridge plug can be set in wells having temperatures in the range of from 60–400 degrees Fahrenheit (°F) and even these limits can be exceeded with adequate precaution. Cement may be set and the vent pipe manually closed at the operator's convenience following setting, eliminating predetermined time brackets required in the prior art. This through-tubing bridge plug allows setting a plug while a well is producing at rates of 350 barrels a day or greater. This is primarily because the vent tube is not used to carry cement to the fabric bag, but is used only for fluid bypass purposes. A separate collapsible tube is used to supply cement slurry to the fabric bag. The collapsible tube also affords a much simplified cement slurry delivery technique and allows the largest possible fill tube size without requiring reducing the size of the vent tube. Also, the fabric bag allows water to seep from the cement slurry and effect the best possible set cement. The sheep shank folded cable prevents kinking, fouling, twisting and the like.

Moreover, the vent plug may be moved up into sealing relationship with the vent tube to close the open passageway, at the operator's convenience, to form a plug that is protected by surrounding encasement of cement in the fabric bag 121. The closure rod 127 cannot be pulled from the bridge plug unless proper closure of the vent tube is effected. Thus, bringing the closure rod back to the surface affords positive evidence that a proper seal has been attained through a properly set vent plug.

A protective steel cover tube is employed during the running in to prevent damaging the respective components of the bridge plug assembly 27.

The usual materials of construction may be employed in this invention and no exotic new and expensive materials are required.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A method of emplacing a bridge plug in a well bore penetrating subterranean formations, said well bore having casing and tubing therein, comprising the steps of:
   a. running a dump bailer containing a cement slurry, a covered and collapsed inflatable bag and locking dogs downwardly through said tubing to a predetermined depth in said well bore;
   b. releasing a first set of dogs that engage said casing for holding against an upward force;
   c. lifting the cover upwardly from around said bag to expose it and a second set of dogs that engage said casing for holding against a downward force;
   d. opening a collapsible fill tube intermediate said dump bailer and said bag and dumping said cement slurry to fill said bag to expand it outwardly into contact with said casing;
   e. providing an open passageway through the bag of cement to allow fluids to flow through said passageway during curing of the cement slurry;
   f. removing said dump bailer and cover tube from said well bore;
   g. dumping a supplemental batch of cement slurry on top of said bag of partially cured cement slurry;
   h. providing an open passageway through said supplemental batch of cement slurry such that said passageways communicate and are maintained open to fluid flow during curing of the cement slurry to set cement;
   i. closing said open passageway; and
   j. thereafter dumping additional cement slurry on top of said cement and vent tube and allowing it to set to form a complete bridge plug without requiring removal of said tubing.

2. The method of claim 1 wherein water is allowed to seep from said cement slurry through water-permeable walls of said bag for effecting set cement of improved physical properties.

3. The method of claim 1 wherein said open passageway is closed by emplacing a plug therewithin and inside the set cement in said bag for greater strength and protection.

4. The method of claim 1 wherein said open passageway is manually closed.

5. The method of claim 1 wherein the closing of said passageway releases a tattle tell which is returned to above ground.

6. Apparatus for emplacing a bridge plug in a well bore penetrating subterranean formations, said well bore having casing and tubing therein, comprising:
   a. a cable for running into said well bore;
   b. a dump bailer connected with said cable; said dump bailer being adapted for containing cement slurry;
   c. a collapsed bag for receiving said cement slurry; said bag being extensible radially outwardly into contact with said casing;
   d. a fill tube connected intermediate said bag and said dump bailer for carrying said cement slurry from said dump bailer to said bag;
   e. a vent tube providing an open passageway through said bag for bypassing fluid during curing of said cement slurry in said bag after said bag has been filled with said cement slurry and distended outwardly into contact with said casing;
   f. vent plug aligned with said vent tube and movable longitudinally for plugging said vent tube when said vent plug is subjected to a second force acting upwardly;
   g. closure means for moving said vent plug into its closed position within said vent tube; said closure means being connected with said vent plug and being releasable with a sufficient third upward force that is greater than said second force;
   h. dog means connected with said vent tube for engaging said casing to hold said vent tube and said bag in place against respective forces upwardly and downwardly;
   i. cover tube covering said bag, said vent tube, said vent plug and said dog means in a run-in configuration for being run into said well bore; said cover tube having an outside diameter less than the internal diameter of said tubing so as to move longitudinally thereof; said cover tube holding said dog means retracted in said run-in configuration;
   j. release means adapted to release said dog means for engaging said casing to hold against a first upward force sufficient to move said cover tube from around said bag and said vent tube; said release means being remotely operable by an operator at the surface; and
   k. opening means connected with said dump bailer for effecting dumping of said cement slurry from said dump bailer into said fill tube and said bag.

7. The apparatus of claim 6 wherein said opening means comprises a cable that is folded in a vertical sheep shank fold to pay out cleanly without kinking, fouling and twisting as said cover tube is pulled upwardly from around said bag and fill tube; a valve body; and a cement valve connected to the lower end of said cable to effect dumping of said cement slurry into said fill tube and bag; cement valve having a limit means for limiting its distance of movement with respect to said valve body.

8. The apparatus of claim 6 wherein centralizer means are included under said cover tube to ensure that said bag fills properly and concentrically about said vent pipe and centralized within said casing.

9. The apparatus of claim 6 wherein said bag has walls that are permeable to water so as to allow water to seep from said cement slurry for effecting a better set cement and has a permeability less than that which adversely affects the set cement.

10. The apparatus of claim 9 wherein said fill tube is collapsible and flexible so as to have a large passageway therethrough facilitating cement flow and has walls that are impermeable to water so as to retain said cement slurry in a readily flowable condition until it reaches said bag.

11. The apparatus of claim 6 wherein said vent tube has a sealing surface disposed within the longitudinal traverse of said bag and said vent plug sealingly seats against said sealing surface to form a block that is protected by the set cement in said bag for great strength, reliability and durability.

12. The apparatus of claim 11 wherein there is provided a laterally extending aperture that communicates with the exterior of said vent tube below said bag and with an internal passageway said vent tube for passage of fluid; said closure means comprises a lineal closure member; and said vent plug is disposed below said laterally extending aperture and is connected with said closure member by an interlock system that will not release said closure member or tattle tell until said vent plug is properly seated against said sealing surface; said interlock system comprising:
 a. a closure release having a peripherally disposed groove;
 b. a first set of a plurality of first balls disposed in said groove and concentrically interiorly of said vent plug in a first bore;
 c. a second annular groove extending outward from said first bore and disposed above said first set of first balls longitudinally of said first bore such that said first balls can fall radially outwardly for release after being moved upwardly to the level of said second annular groove;
 d. a ball wedge disposed in said first bore for being pulled upwardly to wedge said balls into said second annular groove;
 e. shear pin means shearably connected to said closure release and said ball wedge;
 f. a captive plug disposed in said bore and having a skirt portion with apertures encircling said first balls so as to be retained in said first bore with said first balls;
 g. seal means intermediate said captive plug and interior walls of said bore;
 h. a captive rod connected to said captive plug and extending downwardly a predetermined first distance;
 i. a tubular plug housing connected with said vent pipe and having a second bore traversing longitudinally thereof;
 j. a tubular plug shaft disposed interiorly of said plug housing and extending longitudinally thereof a second distance that is less than said first distance; said second distance being great enough to allow upward movement of said vent plug sufficiently to sealingly seat on said sealing surface;
 k. a third groove disposed peripherally about the lower portion of said captive rod;
 l. a second set of second balls disposed in respective apertures in said plug shaft intermediate said third groove and the interior wall of said second bore of said tubular plug housing so as to prevent relative movement between said plug shaft and said captive rod; and
 m. a fourth annular groove extending radially outwardly from said second bore adjacent the upper end of said tubular plug housing for allowing said second balls to fall outwardly when moved thereto; whereby said vent plug can be pulled upwardly past said laterally extending aperture and into sealing relationship with said sealing surface, said second balls can fall radially outwardly, allowing said captive rod and said captive plug to move upwardly sufficiently for said first balls to fall outwardly, allowing said closure release and said ball wedge to move upwardly, wedging said first balls in place to immobilize said vent plug and allow said shear pin means to be sheared to pull said closure member free for removal from said well bore.

13. A through-tubing bridge plug comprising:
 a. a vent tube;
 b. a collapsible and extensible packer element carried by said vent tube;
 c. vent closure means carried by said vent tube;
 d. vent closure operating means operable at will to close said vent tube and including tattle-tell means; and
 e. release means operable to release said tattle-tell means for return to above-ground upon and only upon movement of said vent closure means to the close vent tube position.

* * * * *